(12) United States Patent
Hale et al.

(10) Patent No.: US 6,450,098 B1
(45) Date of Patent: *Sep. 17, 2002

(54) PERMANENT HEAT ACTIVATED INK JET PRINTING PROCESS

(75) Inventors: Nathan Hale; Ming Xu, both of Mt. Pleasant, SC (US)

(73) Assignee: Sawgrass Systems, Inc., Mt. Pleasant, SC (US)

( * ) Notice: Subject to any disclaimer, the term of this patent is extended or adjusted under 35 U.S.C. 154(b) by 65 days.

This patent is subject to a terminal disclaimer.

(21) Appl. No.: 09/661,931

(22) Filed: Sep. 14, 2000

Related U.S. Application Data

(63) Continuation-in-part of application No. 09/206,262, filed on Oct. 27, 1998, which is a continuation of application No. 08/749,426, filed on Nov. 15, 1996, now abandoned, which is a continuation-in-part of application No. 08/565,999, filed on Dec. 1, 1995, now Pat. No. 5,601,023, which is a continuation-in-part of application No. 08/506,894, filed on Jul. 25, 1995, now Pat. No. 5,734,396, which is a continuation-in-part of application No. 08/207,756, filed on Aug. 8, 1994, now Pat. No. 5,485,614.

(51) Int. Cl.[7] .............................................. B41L 35/14
(52) U.S. Cl. .................... 101/488; 400/120.01; 347/99; 347/100
(58) Field of Search .......................... 400/120.01, 240, 400/241.1; 156/230, 240, 583.1; 8/471; 347/99, 54, 100, 88; 101/487, 488

(56) References Cited

U.S. PATENT DOCUMENTS

| | | |
|---|---|---|
| 3,844,806 A | 10/1974 | Wegmann |
| 3,948,828 A | 4/1976 | Becker et al. |
| 3,969,302 A | 7/1976 | Wegmann et al. |
| 3,977,828 A | 8/1976 | Becker et al. |
| 4,042,320 A | 8/1977 | Becker et al. |
| 4,042,545 A | 8/1977 | Defago et al. |
| 4,205,991 A | 6/1980 | Becker et al. |
| 4,207,067 A | 6/1980 | Becker |
| 4,265,631 A | 6/1980 | Becker |
| 4,265,630 A | 5/1981 | Bauerle |
| 4,281,999 A | 8/1981 | Becker et al. |
| 4,370,144 A | 1/1983 | Skelley et al. |
| 4,422,854 A | 12/1983 | Hahnle |
| 4,460,374 A | 7/1984 | Abel et al. |
| 4,559,150 A | 12/1985 | Becker |
| 4,689,078 A | 8/1987 | Koike et al. |
| 4,713,081 A | 12/1987 | Becker |
| 4,969,951 A | 11/1990 | Koike et al. |
| 5,028,262 A | 7/1991 | Barlow |
| 5,229,786 A | 7/1993 | Suga et al. |
| 5,250,121 A | 10/1993 | Yamamoto |
| 5,281,261 A | 1/1994 | Lin |
| 5,643,387 A | 7/1997 | Berhauser |

FOREIGN PATENT DOCUMENTS

| | | |
|---|---|---|
| BR | 1 527 396 | 10/1978 |
| EP | 745 651 A1 | 12/1996 |
| GB | 2 189 436 A | 10/1987 |
| JP | 53-53414 | 5/1978 |
| JP | 61-118477 | 6/1986 |
| JP | 62-57750 | 12/1987 |
| WO | PCT/NL97/00426 | 1/1998 |

Primary Examiner—Ren Yan
(74) Attorney, Agent, or Firm—B. Craig Killough

(57) ABSTRACT

An image is printed on a substrate by means of a computer driven printer using heat activated dyes, without activating the dyes during the process of printing onto the substrate. The dyes are subsequently activated by applying sufficient heat and pressure to the substrate to activate the dyes.

8 Claims, 3 Drawing Sheets

PERMANENT HEAT ACTIVATED INK JET PRINTING PROCESS

This application is a continuation-in-part of Ser. No. 09/206,262, filed Oct. 27, 1998; which is a continuation of Ser. No. 08/749,426, filed Nov. 15, 1996, now abandoned; which is a continuation-in-part of application Ser. No. 08/565,999, filed Dec. 1, 1995, now U.S. Pat. No. 5,601,023, issued Feb. 11, 1997; which is a continuation-in-part of application Ser. No. 08/207,756, filed Aug. 8, 1994, now U.S. Pat. No. 5,485,614, issued Jan. 30, 1996, and a continuation-in-part of application Ser. No. 08/506,894, filed Jul. 25, 1995, now U.S. Pat. No. 5,734,396, issued Mar. 24, 1998.

FIELD OF THE INVENTION

This invention relates to printing generally, and is more specifically directed to a method of printing heat activated ink by means of an ink jet printer onto paper or other printable substrate as a medium, and subsequently heat activating the ink, thereby transferring the design formed by the ink from the medium to a substrate on which the design is to permanently appear.

BACKGROUND OF THE INVENTION

Words and designs are frequently printed onto clothing and other textile materials, and other objects. Common means of applying such designs to objects include the use of silk screens, and mechanically bonded thermal transfers.

The use of computer technology allows substantially instantaneous printing of images. For example, video cameras or scanning may be used to capture an image to a computer. The image may then be printed by any suitable printing means, including mechanical thermal printers, ink jet printers and laser printers. These printers will print in multiple colors.

Color ink jet printers are in common use. Color ink jet printers use combinations of cyan, yellow and magenta inks or dyes to produce multi-color images.

The primary types of ink jet printers currently in use fall into three categories: phase change, free flow, and bubble jet. The inks or dyes used in phase change ink jet printing are contained in a solid compound which changes state by the application of heat to liquify the solid, whereupon the ink composition is printed. Free flow and bubble jet printers use liquid inks, although the actual printing process of free flow ink jet printers differs from bubble jet printers.

Heat activated transfer ink solids change to a gas at about 400° F., and have a high affinity for polyester at the activation temperature and a limited affinity for most other materials. Once the gassification bonding takes place, the ink is permanently printed and highly resistant to change or fading caused by laundry products.

Hale, U.S. Pat. Nos. 5,246,518, 5,248,363 and 5,302,223 disclose the use of thermal printers to produce an image on a medium or transfer sheet wherein the image is comprised of sublimation or other heat activated inks. The method described in Hale does not activate the ink during the printing of the medium or transfer sheet.

The process of printing heat sensitive ink solids such as sublimation inks by means of a phase change ink jet printer is similar to the process described in Hale, U.S. Pat. Nos. 5,246,518, 5,248,363 and 5,302,223. The use of heat by all ink jet printers presents the problem recognized in the Hale patents of printing heat activated inks in a non activated form by means of such printers, since the ink is exposed to high temperatures by the printer. Bubble jet printers, for example, heat the ink during the printing process to around the boiling point of the ink solvent, which is typically water. Free flow ink jet printers use heat to form pressure which transports the ink during the printing process.

The use of liquid inks, as required by free flow and bubble jet printers, presents a new set of problems when trying to print ink solids. The orifices or nozzles of free flow and bubble jet printers are not designed for the dispensing of solids contained within a liquid material. The orifices of these printers are typically 5–10 microns in diameter, and clogging of the orifice will occur when ink solids of large particle size or in high volume are transferred through the orifice.

Further, when the ink solids are placed into the liquid, the ink solids tend to separate from the liquid over time and fall to the bottom of the ink container. The ink composition is typically sealed in a container at a manufacturing facility, for subsequent mounting of the container within the ink jet printer, meaning that a substantial storage time for the ink composition exists prior to use. Separation of the liquid and solids within the ink formulation presents problems with regard to the mechanical operation of the printer and the print quality achieved from use of the ink formulation. Materials which inhibit separation must also inhibit agglomeration of the solid dye particles, while allowing, and not preventing due to insulation or otherwise, activation of the ink or dye during the final printing at elevated temperatures.

SUMMARY OF THE PRESENT INVENTION

The present invention is a method of printing heat activated ink solids in a non activated form onto a medium in a desired image by means of an ink jet printer, for subsequent transfer of the image from the medium by heat activation of the ink solids. The invention includes ink or dye compositions comprising heat activated ink or dye solids for use with the method. The ink compositions presented include solid compositions at ambient temperature for use with phase change ink jet printers, and emulsions or colloids for use with free flow and bubble jet printers.

The ink solids are transferred in the desired design by means of a printer onto a substrate, which acts as a medium. The substrate may be paper, or it may be other material which will facilitate and withstand the transfer temperature, and which facilitates bonding of the ink layer to the substrate.

The ink jet printer incorporates a thermal process, but the ink solids of the invention do not activate at the operational temperatures of the printer. Heat activation of the ink solids does not take place at the time of printing of the image by the printer, but rather, takes place at the time of the transfer of the image from the medium to the substrate on which the image is permanently applied. The non activated ink solids produce a printed image on the medium which is recognizable, but the colors are dull and are not acceptable for most applications.

Sufficient temperature is then applied to the image to transfer the image from the medium to the substrate on which the image is to permanently appear . The heat activates, or sublimates, the ink solids during this transfer from the medium to the substrate. The image is then permanently bonded to the substrate. The permanent image is sharp, with vivid colors forming the image.

When the ink formulation prepared according to the invention is a liquid, finely divided dye solids are present in a liquid carrier, in a colloidal or emulsion form. An emulsifying enforcing agent, which has characteristics of a surfactant, surrounds and shields the dye particles to prevent undesired activation at low heat and to prevent agglomeration of the dye particles. However, the emulsifying enforcing agent allows activation of the dye at higher temperatures.

DETAILED DESCRIPTION OF THE PREFERRED EMBODIMENT

Figure 1:
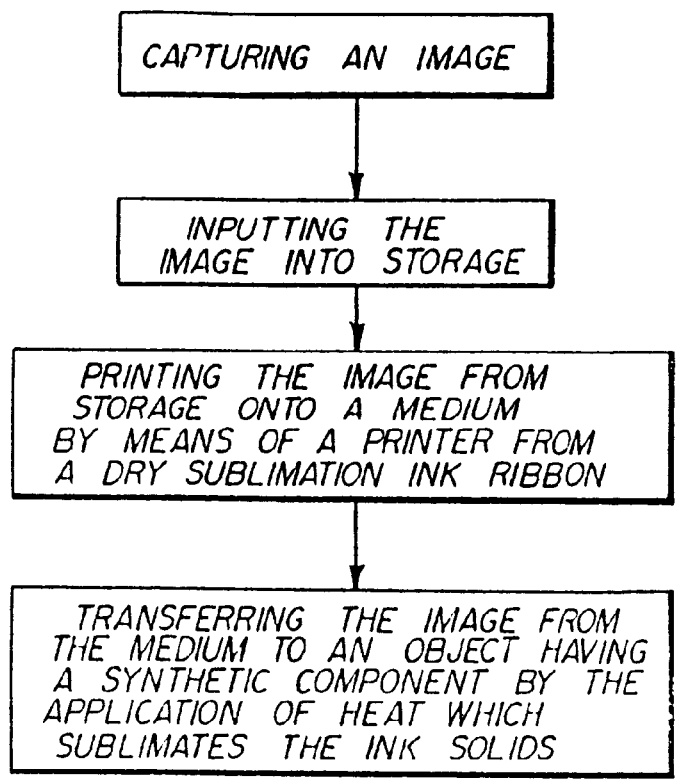
FIG. 1 is a block diagram showing the printing process.
Figure 2:
FIG. 2 illustrates an example of a design printed by a printer using the printing process.
Figure 3:
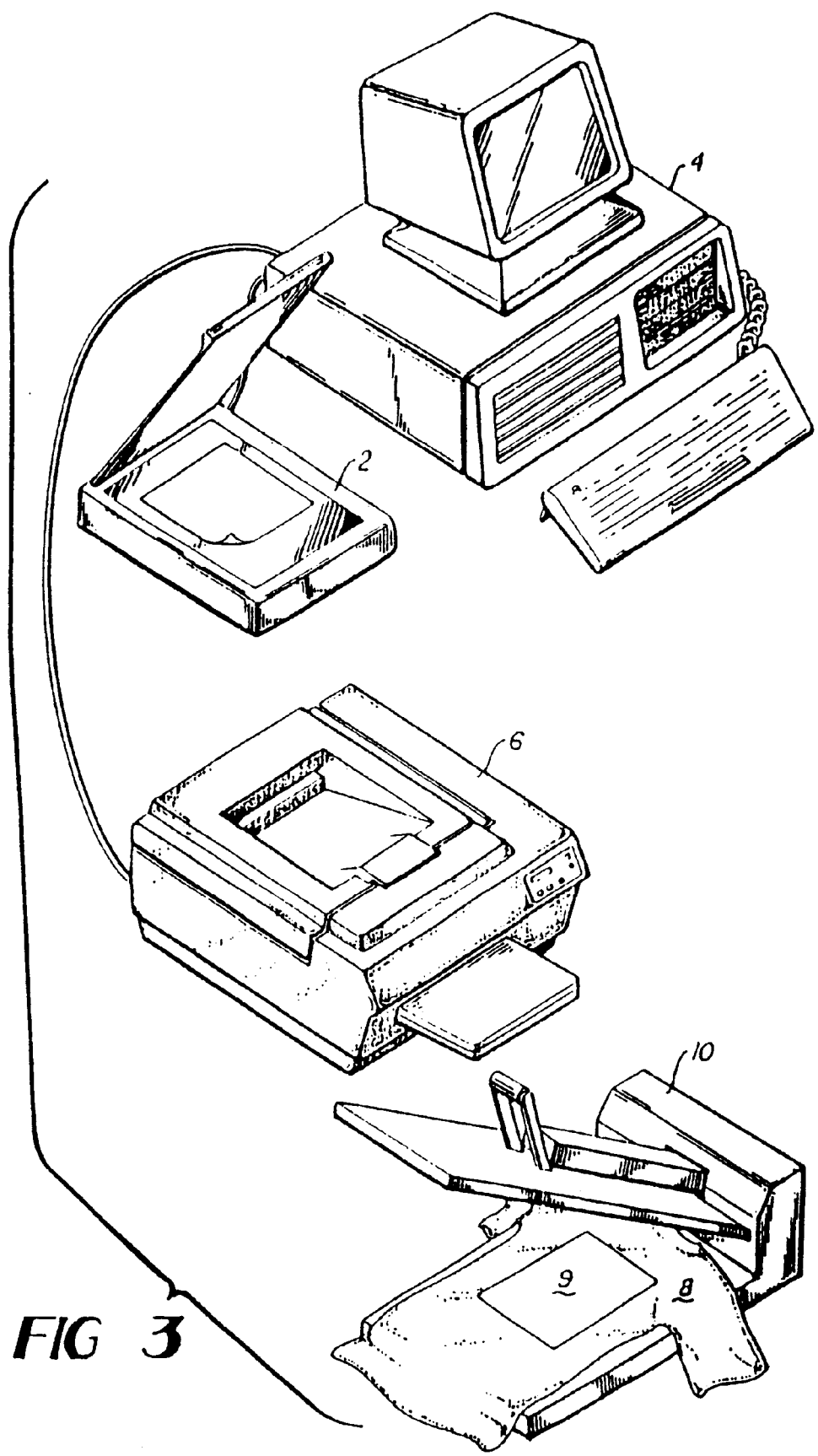
FIG. 3 is a diagrammatic illustration showing exemplary elements of computer and printing systems which could be used to achieve the printing process.

In the preferred embodiment, a video camera or scanning device 2 is used to capture an image 3. The image is then input into a computer 4. The computer directs a printer 6 to print the image. Any means of forming the an image which may be printed from a computer may be used, including images generated by software. Available computer design graphic software may be used, or still photography may be used. The design may be photographic, graphic artistic, or simply letters or words. The use of cyan, yellow and magenta ink compositions allow the printer to print in full color or multi-color designs.

In the present invention, heat activated dyes are used, and are transferred to a substrate by the printer without activating the dyes. The heat activated dyes are transferred onto the medium by the printer.

Virtually any material may be used as a substrate which can be printed upon by a printer, and which will withstand the heat activated transfer temperature of approximately 400° F., as described herein. This substrate may be any paper commonly used with color ink jet printers, however, standard bond paper may be used, or even a sheet of metal, if the metal can be handled by the printer.

Once the image is printed onto the substrate, the image may be permanently transferred, or at a later time. Most commonly, the design will be transferred onto a textile, such as a shirt 8, although the image may be transferred onto other materials, such as metal, ceramic, wood, or plastic. The design 3, which is printed onto the medium 9 without activating the ink. A temperature which is sufficient to activate the ink solids is then applied. This temperature will typically be around 400° F. This temperature is applied for a time sufficient to heat activate the ink solids. A heat transfer machine 10 may be used to accomplish the activation of the inks. Activation, or sublimation, does not take place at the time of printing the image onto the substrate, even though heat may be used to accomplish the printing of the image onto the substrate, but occurs later, such as during the transfer from the medium to the substrate.

Figure 4:
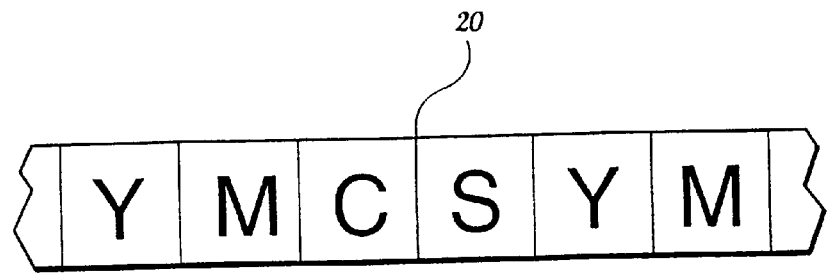
FIG. 4 is a section of a ribbon used with a color thermal printer demonstrating the three color panels of yellow, magenta and cyan respectively, and a fourth panel having surface preparation material thereon, in a repeating pattern.
Figure 5:
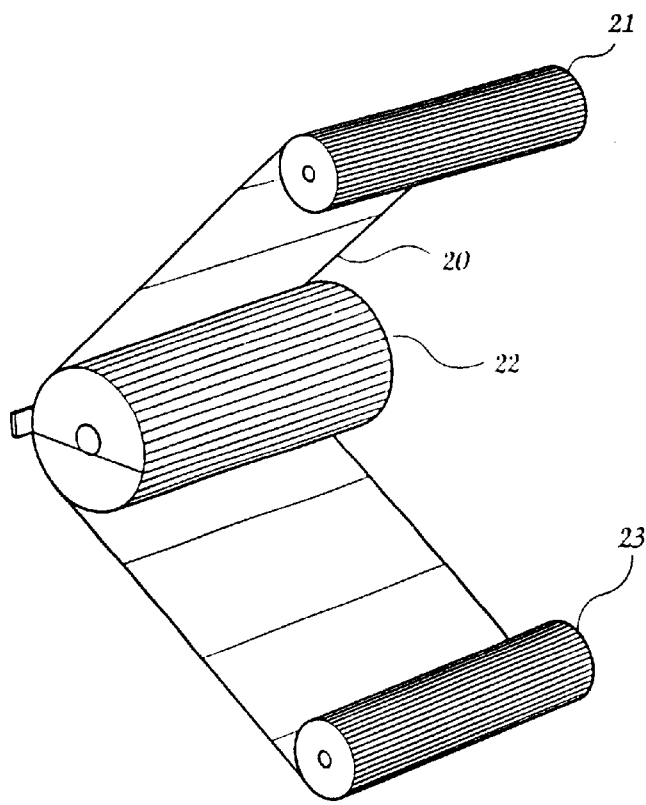
FIG. 5 demonstrates a ribbon on a roll as the ribbon is transported in a thermal printer.
Figure 6:
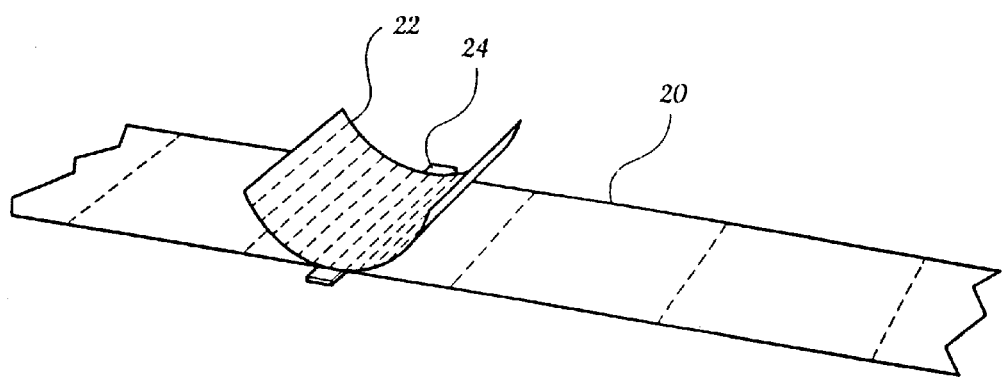
FIG. 6 shows a section of the ribbon as it comes in contact with the print head of the thermal printer.

A thermal printer which prints from a ribbon may be used. The ribbon 20 is taken from a roll 21 past a platen 22 and print head 24 on to a take up roll 26. FIGS. 4 and 5. The use of cyan, yellow and magenta panels on the ribbon allow the printer to print in full color or multi-color designs.

The ribbon substrate as used with the printer may be a plastic or a polyester ribbon. The dry release, heat activated ink solid may be retained on the ribbon by the use of a heat sensitive material which will release the ink upon the application of heat to the ribbon. The printer, such as a thermal transfer printer, will transfer the ink in the desired design and colors from the ribbon to the medium at a temperature of approximately 140° F. This temperature is sufficient to release the heat sensitive material to allow printing of the dye, without activating the dye. The wax aids in holding the heat activated dye on the substrate in the precise design, eliminating the need for specially coated paper, while also producing an image which has high resolution.

Color thermal printers print from a ribbon having multiple panels of ink bound to the ribbon. Typically, the panels have recurring sequences of cyan, yellow and magenta ink, from which multiple color or full color images may be produced.

In use, the thermal printer makes four passes to print the image from the ribbon. The color image is printed in the desired form and image by means of the three color panels present on the ribbon.

Phase change ink jet printers use an ink composition which is solid at ambient temperature. The ink composition may be in a solid stick form. This "ink stick" comprises heat activated inks, and a phase change material, or transfer vehicle, which will liquify upon the application of heat to the ink composition. A polymer binder and additives may be added to the ink composition. The additives may be used to control melting, flow, drying, corrosion and other variables. The composition is changed from solid to liquid by melting the ink stick in a controlled fashion, to apply the ink solids to the medium, and achieve printing. The melted ink composition is contained in a liquid form in a reservoir at the necessary elevated temperature to maintain the ink composition in liquid form. The liquified ink composition is then taken from the reservoir and printed on demand. The ink composition may be present in the printer in three or more colors, such as cyan, yellow and magenta, and applied by the printer in combination to achieve multiple color or full color printing.

The transfer vehicle may be a wax or wax like material, such as a certain polymers having a low molecular weight and low melting point. Since wax and wax like materials in liquid form tend to have an affinity for paper, the transfer vehicle will readily bond with the paper medium, holding the ink solids to the medium, until the ink solids are released by the application of heat which is sufficient to activate and transfer the ink solids.

The formulation for an ink composition used with a phase change ink jet printer is as follows:

| Material | Weight % |
| --- | --- |
| Heat Activated Dye/Ink Solid | 5–30 |
| Transfer Vehicle | 20–70 |
| Emulsifying Enforcing Agent | 1–20 |
| Binder | 0–30 |
| Plasticizer | 0–15 |
| Foam Control Agent | 0–10 |
| Viscosity Control Agent | 0–10 |
| Surface Tension Control Agent | 0–10 |

| Material | Weight % |
| --- | --- |
| Diffusion Control Agent | 0–10 |
| Flow Control Agent | 0–15 |
| Corrosion Control Agent | 0–10 |
| Antioxidant | 0–5 |
| TOTAL | 100% |

The heat sensitive or heat activated dye or ink solid may be a sublimation ink which is finely divided. It is preferred that the solid particle have a diameter which is no larger than 0.1 micron. The transfer material is a wax or wax like material which liquifies at a temperature of 70 to 120° C. to allow printing of the ink onto the medium.

The emulsifying enforcing agent acts as a dispersing agent through which the ink solids are distributed. The emulsifying enforcing agent may be one or more polymers or surfactants, which should be anionic. The binder may be a polymer which strengthens the ink stick when the ink stick is in solid form. The plasticizer increases the solubility of the ink for formulation of the ink stick. The foam control agent and viscosity control agent aid in formulating the ink stick.

The surface tension control agent may be a surfactant. This agent aids in printing of the ink formulation. The diffusion control agent helps control the diffusion of the ink as it is applied to the medium. The flow control agent helps control the melting temperature and rate of the ink during the printing process.

FORMULATION EXAMPLE #1: Cyan phase-change ink-Jet Ink Formula:

| Material | Weight % |
| --- | --- |
| Sublaprint ® Blue 70014[1] | 10.0 |
| Polywax ® PE500[2] | 10.0 |
| Exxon FN ® 3505[3] | 58.0 |
| DisperByk ® 182[4] | 0.5 |
| Vinnapas ® B1.5[5] | 1.5 |
| Piccolastic ® A25[6] | 10.0 |
| Polygard ® [7] | 5.0 |
| Dibutyl Phthalate | 5.0 |
| Total: | 100.0 |

[1] Keystone Aniline Corporation
[2] Petrolite Corp.
[3] Exxon Chemical Co.
[4] BYK-Chemie, USA
[5] Wacker Chemicals (USA)
[6] Hercules Inc.
[7] Uniroyal Chemical Co.

Polywax PE500 is a transfer vehicle. This transfer vehicle is a wax-like polymer material. Exxon FN 3505 is a hydrocarbon wax used as part of the transfer vehicle. Other waxes or combinations could be used as the transfer vehicle depending on the printer, its operation temperature, the ink to be printed and the medium to be printed.

DisperByk 182 is an emulsifying enforcing agent. An anionic emulsifying enforcing agent should be used. DispersByk is a polymer type surfactant. Vinnapas B1.5 and Piccolastic are used as binders. Polygard is an antioxidant which is used for corrosion control. Dibutyl phthalate is a plasticizer.

Free flow ink jet printers and bubble jet ink jet printers use inks which are in a liquid form. Free flow ink jet printers dispense ink through an orifice in an ink container. The printer commands and controls the flow of ink through the orifice to print in the desired manner.

Bubble jet printers also use inks which are in a liquid form, and which are held in a container. Bubble jet printers use a different orifice or nozzle system than free flow printers. A channel and heating system is used to form a bubble. The formation of the bubble is controlled by the printer by the application of heat to the ink to print as desired.

The heat activated inks or dyes are solid particles. Free flow and bubble jet printers are designed to be used with liquid inks, but not with inks having solid particulate within the liquid. The presence of solid material clogs the orifice or nozzle of the printer. Further, liquid ink compositions into which a solid particulate is placed or dissolved are not homogenous over time. The solid ink particles in the mixture settle from the liquid toward the bottom of the ink container. This settling increases the clogging of the orifice. Further, print quality is affected if the ink is not consistent.

The liquid ink composition of the present invention is an emulsion comprised of finely divided heat activated ink solids which are placed in an emulsion by means of an emulsifying enforcing agent which is present in a solvent. Humectants, corrosion inhibitors, surfactants, and anti-foaming agents may also be included in the composition.

The formulation of an emulsion comprising heat activated ink solids which is used with ink jet printers requiring liquid inks is as follows:

| Material | Weight % |
| --- | --- |
| Heat Activated Dye/Ink Solid | 5–30 |
| Emulsifying Enforcing Agent | 1–20 |
| Binder | 0–30 |
| Humectants | 0–40 |
| Foam Control Agent | 0–10 |
| Fungicide | 0–2 |
| Viscosity Control Agent | 0–10 |
| Surface Tension Control Agent | 0–10 |
| Diffusion Control Agent | 0–10 |
| Flow Control Agent | 0–15 |
| Evaporation Control Agent | 0–20 |
| Corrosion Control Agent | 0–10 |
| Cosolvent | 0–30 |
| Solvent | 30–90 |
| TOTAL | 100% |

The heat activated dye or ink solid is finely divided and placed into an emulsion by means of the emulsifying agent and the solvent, which may be water. The remaining agents may be added to facilitate formulation, storage and/or printing of the liquid ink composition.

FORMULATION EXAMPLE #2-Yellow Ink-Jet Formula:

| Material | Weight % |
| --- | --- |
| Bafixan ® Yellow 3FE[8] | 2.0 |
| Dipropylene Glycol | 4.5 |
| DMSO | 1.5 |
| Cobratec ®[9] | 0.45 |
| NaOH (10N) | 3.0 |
| Distilled H$_2$O | 88.55 |
| Total: | 100 |

[8] BASF Corporation
[9] PMC Specialties Group

Formulation Example 2 comprises a heat activated yellow ink solid or dye.

Dipropylene glycol and DMSO are co-solvents. Sodium Hydroxide is an inorganic emulsifying enforcing agent, which also acts as a fungicide. Distilled water acts as a solvent. Cobratec® acts as a corrosion inhibitor.

In this formulation, a particular ink solid is finely divided to yield a small particle size. The particular ink solid of Example 2 will tend to substantially dissolve within sodium hydroxide, which is used as the emulsifying enforcing agent. The combination of the sodium hydroxide and the solvent, which is the formulation example is distilled water, yield an emulsion which may be used in bubble jet and free flow ink jet printers.

Generically, a "humectant" is a moisturizing agent. In the relevant art, the term "humectant" is used to describe agents which are included in ink formulations to regulate the rate at which the ink dries and to control the viscosity of the ink. In addition to these properties, the present invention may comprise one or more humectants which will prevent clogging of the orifice or nozzle. With certain inks, the humectants will regulate the sublimation rate of the inks or dyes as they are transferred from the medium to the object on which the printed design is to permanently appear. The humectant in formulation example 2 is dipropylene glycol, which acts as a co-solvent and humectant.

FORMULATION EXAMPLE #3; Cyan Ink-Jet Formula:

| Material | Weight % |
|---|---|
| Sublaprint ® Blue 70013[10] | 1.0 |
| Lignosol ® FTA[11] | 3.5 |
| ME ® 39235[12] | 10.0 |
| Diethylene Glycol | 9.5 |
| DMSO | 1.0 |
| Distilled H$_2$O | 75.0 |
| Total: | 100.00 |

[10]Keystone Aniline Corporation
[11]Lignotech (U.S.) Inc.
[12]Michelman, Inc.

Sublaprint® Blue 70013 is a heat activated ink or dye solid. Lignosol® FTA and ME® 39235 are emulsifying enforcing agents. Lignosol® FTA also acts as a fungicide. ME® 39235 is a polymer, and more specifically, it is a polyethylene binder. Diethylene Glycol and DMSO act as humectants. The solvent is distilled water.

Sublaprint® Blue 70013 is more difficult to sublimate than Bifaxan® Yellow 3GE, and is less soluble in the emulsifying enforcing agent. Diethylene glycol is used as a humectant to facilitate sublimation of the Sublaprint® Blue ink solid.

The heat activated ink solid is finely divided to a small particle size. The finely divided ink solid is combined with one or more emulsifying enforcing agents, which are in turn combined with the solvent.

Formulation Example #4: Magenta Ink-Jet Ink Formula:

| Material | Weight % |
|---|---|
| Intratherm ® Brill Red P-31NT[13] | .5 |
| Lignosol ® FTA[14] | 3.0 |
| ME ® 39235[15] | 11.0 |
| NA-SUL ®[16] | 1.0 |
| DeeFo ® 806-102[17] | 0.2 |
| Sorbitol | 0.5 |
| Dipropylene Glycol | 3.5 |
| Distilled H$_2$O | 79.3 |
| Total: | 100 |

[13] Crompton & Knowles Corporation
[14] Lignotech (U.S.) Inc.
[15] Michelman, Inc.
[16] King Industries
[17] Uftra Additives Formulation Example #4 comprises a heat activated ink solid or dye which is finely divided and combined in an emulsifying enforcing agent. The emulsifying enforcing agent or medium is, as with Example #3, Lignosole FTA and ME® 39235. Distilled water is used as a solvent. Dipropylene Glycol is used as a humectant.

Formulation Example #4 further comprises an anti-foaming or foaming control agent, DeeFo® 806-102 to retard foaming of the liquid ink composition. Formulation Example #4 further comprises a surfactant, which may be Sorbitol®, and a corrosion inhibitor, which, in this example, is NA-SULE®.

Formulation Examples 2, 3 and 4 are emulsions. In Example 2, the particular dye has a tendency to dissolve in the emulsifying enforcing agent. Formulation Examples 3 and 4 may also be described as colloids, having finely divided ink particles of not larger than 0.1 microns in diameter present within the disperse medium.

The invention provides an emulsion or colloid which will work within free flow ink jet printers, piezo electric printers, and bubble jet printers, without experiencing problems relating to orifice clogging which results from the use of an ink solid. Further, the use of an emulsion or colloid prevents the separation of the ink solids from the liquid components, rendering an ink composition which is stable over time.

Typically, the liquid ink formulations are present within the printers in containers. Three or more colors of liquid ink are present. The containers may be factory sealed, and as such, the ink formulation may be held within the container for a long period of time.

The bubble jet printer forms the bubble which is used to print the ink at approximately the boiling point of the ink solvent. In most formulations, water will be used as the solvent, so that the ink is exposed to temperatures of 100 degrees C. or higher as the ink is printed. Comparable temperatures may be used in free flow ink jet printers to create pressure for the purpose of transporting the ink for printing. As with the phase change ink jet printer, the ink is exposed to temperatures which will activate or sublimate some heat activated inks or dyes. The inks or dyes used in the ink compositions herein will not activate or sublimate at the operational temperatures of the printer.

The liquid ink formulation comprises a liquid carrier. The liquid carrier, or solvent, may be water. An emulsifying enforcing agent, which is soluble in the liquid carrier, forms an emulsion or a colloid in the liquid carrier. The emulsifying enforcing agent has an affinity for the heat activated dye, and attaches to, or may surround, all or part of individual particles of the dye particles.

The heat activated dye as used is a finely divided solid which is substantially insoluble in the liquid carrier. The dye particles, when placed in a liquid, will tend to agglomerate, vastly reducing, and practically eliminating, the efficacy of the ink formulation. The emulsifying enforcing agent is used to form an emulsion or a colloid, and in the present invention, also surrounds and shields, and thereby separates, the individual dye particles from the liquid carrier and from each other, preventing agglomeration of the dye particles, and thereby preventing the ink formulation from clogging the orifices of the printer, such as the ink jets. The emulsifying enforcing agent shields and insulates the dye particles, preventing activation or sublimation of the dye due to exposure to heat present in the printer and the printer processes. The emulsifying enforcing agent shields the dye particles, and improves the shelf life of the ink formulation. The adverse effects of heat, chemical reactions, light, time, and other factors that may be present in the packaging environment, or any environment within or surrounding the printer, or printing processes are eliminated or reduced by the emulsifying enforcing agent. However, while the emulsifying enforcing agent shields the dye particles, the insulation properties of the emulsifying enforcing agent are such that heat activation of the heat activated dye is achieved during final transfer of the image from the medium, which is performed at, or above, the temperature at which the dye activates, and the required optical density of the dye after final transfer by heat activation is attained.

An example of an emulsifying enforcing agent which will achieve the objects of the invention, when used with water as a liquid carrier, is a metallic sulfonate salt known as lignin sulfonate. Lignin sulfonates are sold under various brand names, including Lignosol and Raykrome. Other lignin products which may be used as the emulsifying enforcing agent to produce stable dispersion/emulsion systems include kraft lignin products and oxylignins.

Generally, lignin materials may be categorized by the two main processes in manufacturing lignins: kraft pulping and sulfite pulping. Each of the processes produce lignin materials with different structures and molecular weights, and therefore, they exhibit different performance properties in dye dispersing, stabilizing and emulsification. Other than these two groups, there is a group of lignin products called oxylignins which are derived from lignins that have been oxidized and have a reduced number of sulfonic and methoxyl groups and increased number of functional phenolic, hydroxyl and carboxylic groups.

Lignin products can be further modified through processes or reverse processes of sulfonation, methylation, carboxylation and fractionation, etc. in order to change their chemical and physical properties, such as water solubilities in different pH ranges, molecular weight, heat stability and emulsification ability.

Lignin sulphonate, kraft lignins, or oxylignins can be used as dye dispersant/emulsifying enforcing agents in the invention to generate stable sublimation or heat sensitive dye emulsion/colloid systems, with proper adjustment of solvent and usage level. Lignosulfonate products such as Maprasperse CBA-1 (Lignotech), Marasperse 52CP (Lignotech), Lignosol FTA (Lignotech), Lignosol SFX65 (Lignotech), Temsperse S002 (Temfibre, Inc.) Stepsperse DF series (Stephan Co.), and Weschem NA4 (Wesco Technologies, LTD) may be used. Kraft lignin products such as Diwatex XP (Lignotech), and Reax 85 (Westvaco), and oxylignin products such as Marasperse CBOS6 and Vanisperse CB are suitable for use as the emulsifying enforcing agent in the ink formulation of the present invention. The resulting aqueous system forms a double-layer structure, with a dye particle in the center surrounded by lignin molecules and another hydrated layer on the outer layer, to shield the dye particles from reagglomerating, and from the effects of chemical and physical changes introduced during storage or printing of the ink formulation.

Other materials can be used as either emulsifying enforcing agents or as additives to improve the emulsion/colloid stability, and thereby enhance the printing quality, by eliminating clogging and kogation at the print head. These materials may comprise a concentration from 0.1% to 15% by weight of the total formulation without damaging the sublimation heat transfer quality of the heat-sensitive dye at the heat transfer stage. These materials can be added into the system during the process of reducing the particle size of the dyes, or after the dye particles have been dispersed into the aqueous solution. These materials function also as emulsion/colloid stabilizers, leveling agents, wetting agents, or foam control agents.

The materials which can be used for this purpose include alkylaryl polyether alcohol nonionic surfactants, such as Triton X series (Octylphenoxy-polyethoxyethanol); alkylamine ethoxylates nonionic surfactants such as Triton FW series, Triton CF-10, and Tergitol (Union Carbide Chemicals); polysorbate products such as Tween (ICI Chemicals and Polymers); polyalkylene and polyalkylene modified surfactants, such as Silwet surfactants (polydimethylsioxane copolymers) and CoatOSil surfactants from OSI Specialties; alcohol alkoxylates nonionic surfactants, such as Renex, BRIJ, and Ukanil; Sorbitan ester products such as Span and Arlacel; alkoxylated esters/PEG products, such as Tween, Atlas, Myfl and Cirrasol surfactants from ICI Chemicals and Polymers; unsaturated alcohol products such as surfynol series surfactants from Air Products Co., alkyl phosphoric acid ester surfactant products, such as amyl acid phosphate, Chemphos TR421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SpA); and polyethylene glycol ether surfactants such as Newkalgen from Takemoto Oil and Fat Co.

The solid dyes which are used in the ink formulation and in the printing process have a particle size which is too large for use in ink jet printers, as such dyes are currently commercially available. The particle size and nonsolublilty in water also presents other problems previously discussed. The dye must be finely divided, which may be accomplished using mills, grinders, homogenizers or micronizers. One or more different emulsion enforcing agents including surfactants dispersants, emulsifying agents, wetting agents, defoamers or anti-foamers, or corrosion inhibitors may be used in the process to improve and facilitate the process of finely dividing the dye. Examples of grinding devices to finely divide the dye include microfluidizers, roller mills, vertical mills, horizontal mills, jet mills, ball mills, attrition mills, and ultrasonic micronizer/homogenizing mills.

For example, the heat sensitive dye is mixed with the emulsifying enforcing agent, and/or other additives and co-solvents, and deionized distilled water. The dry chemicals are mechanically mixed, dispersed into the liquid phase, and then fed into grinding facility. The grinding device is operated while monitoring temperature, pressure, viscosity, interfacial tension, surface tension, pH value and flow speed, without activating the heat sensitive dye, until the mean diameter of the dye particles is between 0.1 to 0.5 microns.

Particles which have a diameter of larger than 0.2–0.5 microns should be eliminated from the composition, such as by filtration or centrifuge. The resulting ink composition has a mean particle size of 0.2 microns or less, with the solid percentage ranging from 0.05%–10% by weight, to produce an ink composition which achieves the objectives of the present invention.

What is claimed is:

1. A method of printing a design by means of an ink jet printer using heat activated dye solids, comprising the steps of:
    a. preparing a liquid ink formulation suitable for use in an ink jet printer which uses liquid ink, wherein said liquid ink formulation comprises at least one solvent, at least one emulsifying enforcing agent, and heat activated dye solids which are finely divided to a particle size which yields an emulsion when said heat activated dye solids are emulsified within said at least one solvent by means of said emulsifying enforcing agent;
    b. supplying an ink jet printer which uses liquid ink with said liquid ink formulation;
    c. printing said liquid ink formulation in a desired image by means of said ink jet printer onto a medium at a temperature which is below the temperature at which said heat activated dye solids activate; and
    d. transferring said image from said medium to an object on which the image is to appear by thermal means at a temperature which is above the temperature at which said heat activated dye solids activate, so as to cause said heat activated dye solids to transfer onto said object.

2. A method of printing a design by means of an ink jet printer using heat activated dye solids as described in claim 1, wherein the step of preparing the liquid ink formulation comprises the step of dissolving a sulfonated lignin as an emulsifying enforcing agent in said at least one solvent.

3. A method of printing a design by means of an ink jet printer using heat activated dye solids as described in claim 1, wherein said ink formulation comprises not less than 1 %, nor more than 20%, of said at least one emulsifying enforcing agent by weight.

4. A method of printing a design by means of an ink jet printer using heat activated dye solids as described in claim 1, wherein said at least one solvent is water.

5. A method of printing a design by means of an ink jet printer using heat activated dye solids as described in claim 4, wherein said liquid ink formulation comprises not less than 30% water by weight.

6. A method of printing a design by means of an ink jet printer using heat activated dye solids as described in claim 5, wherein said at least one solvent is water.

7. A method of printing a design by means of an ink jet printer using heat activated dye solids as described in claim 1, wherein said liquid ink formulation comprises from 1 % to 2% by total weight of said liquid ink formulation of said heat activated dye solids, and from 1 % to 20 % of at least one emulsifying enforcing agent.

8. A method of printing a design by means of an ink jet printer using heat activated dye solids as described in claim 1, wherein said medium does not comprise an ink binder prior to printing said liquid ink formulation by means of said jet printer onto said medium.

* * * * *